United States Patent [19]

Kinumoto et al.

[11] 4,440,194

[45] Apr. 3, 1984

[54] MOVING BODY AND METHOD OF PERFORMING WORK WITHIN PIPES WITH USE OF SAME

[75] Inventors: Namio Kinumoto, Osaka; Takashi Nakao, Katano; Hiroshi Murase, Sakai; Shigemitsu Okada, Takarazuka; Shinichi Kawadoko, Osaka, all of Japan

[73] Assignee: Osaka Gas Company, Limited, Osaka, Japan

[21] Appl. No.: 344,967

[22] Filed: Feb. 2, 1982

[30] Foreign Application Priority Data

Feb. 29, 1980 [JP] Japan ................................. 55-26683

[51] Int. Cl.³ ............................................. F16L 55/10
[52] U.S. Cl. ........................................ 138/89; 138/97; 15/104.06 R
[58] Field of Search .................. 138/89, 91, 94, 95, 138/97; 15/104.06 R

[56] References Cited

U.S. PATENT DOCUMENTS

| | | | |
|---|---|---|---|
| 1,218,005 | 3/1917 | Schlemmer | 15/104.06 R |
| 1,993,307 | 3/1935 | Nicholson | 138/89 |
| 2,106,004 | 1/1938 | Inglee | 15/104.06 R |
| 2,188,959 | 2/1940 | Schaer | 15/104.06 R |
| 2,810,143 | 10/1957 | Reynolds | 15/104.06 R |
| 3,041,204 | 6/1962 | Green | 15/104.06 R |
| 3,049,352 | 8/1962 | Hancock | 273/327 |
| 3,074,436 | 1/1963 | Dean | 15/104.06 R |
| 3,731,701 | 5/1973 | Sugeno | 15/104.06 R |

*Primary Examiner*—John W. Shepperd
*Attorney, Agent, or Firm*—Cushman, Darby & Cushman

[57] ABSTRACT

A moving body comprises two members interconnected by a flexible linear member and each symmetrical with respect to a plane perpendicular to the direction of its movement through a pipe. The moving members are congruent with each other and are preferably made of an elastic material. Work is performed in the interior of pipes, for example, for lining with use of the moving body by applying a fluid pressure to the back side of the body. As a preferred example of lining work, the moving body is used for reforming an outworn underground pipe by lining the pipe with a resin layer having strength to withstand an external pressure of at least about 0.1 kg/cm² G per meter of the depth at which the pipe is laid underground. The pipe is used as a frame for this operation.

8 Claims, 13 Drawing Figures

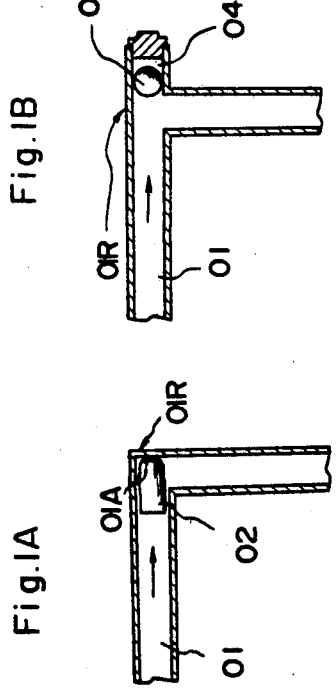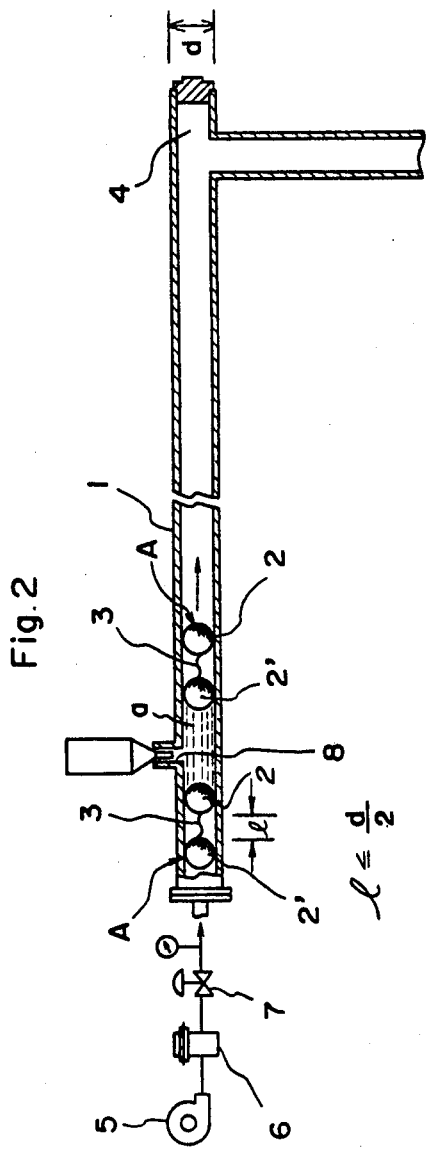

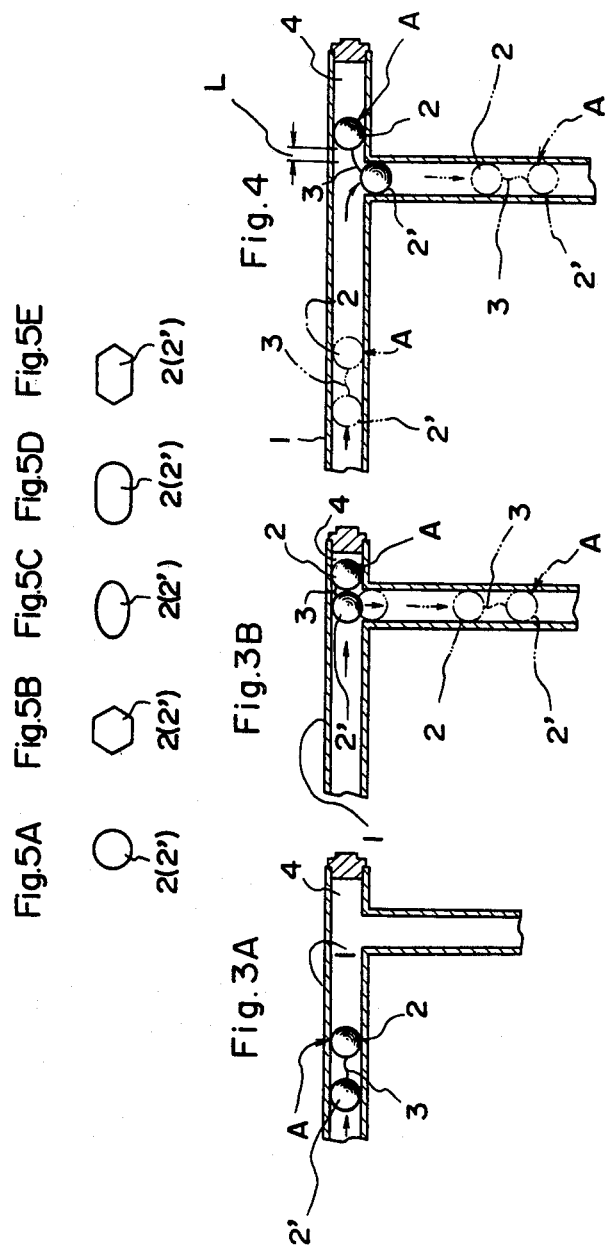

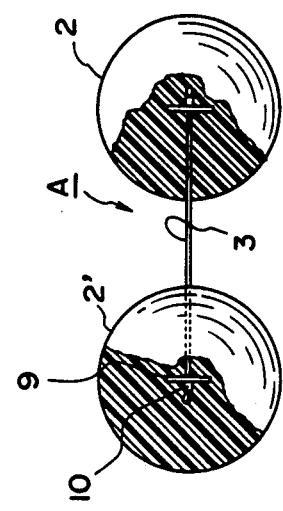
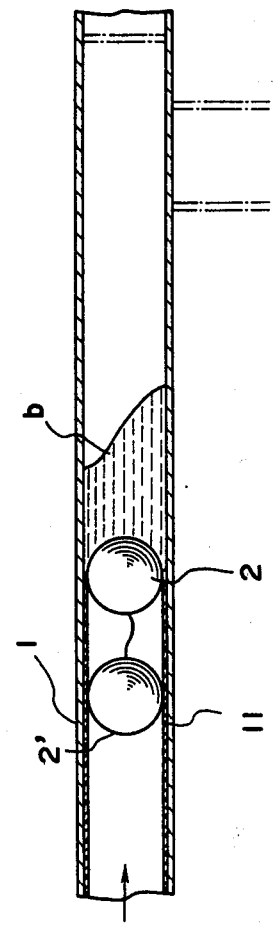
Fig.6
Fig.7

MOVING BODY AND METHOD OF PERFORMING WORK WITHIN PIPES WITH USE OF SAME

BACKGROUND OF THE INVENTION

1. Field of the Invention

The present invention relates to improvements in moving bodies for performing work in the interior of pipes for transporting town gas, petroleum, water and like fluids, and to a method of performing work within pipes with use of such a body.

2. Description of the Prior Art

Moving bodies of this type heretofore known are generally used singly and shaped variously, for example, in the form of a bullet, sphere, etc. in accordance with the work contemplated.

On the other hand, the pipes to be worked on by the movement of such a body include various joints and fittings according to the conditions of location, etc. and therefore have L-shaped, T-shaped and other bends. When a body 02 is caused to move through a pipe 01 having an L-shaped bend O1R, the body moving forward will be impeded upon striking against the inner surface O1A of the bend ahead, if it is in the shape of a bullet as illustrated in FIG. 1A. In the case of a T-shaped bend O1R which is closed with a plug as illustrated in FIG. 1B, a moving body 02 becomes no longer movable upon dashing into the plugged space 04 or upon striking against an inner portion of the pipe if not dashing in. A spherical body, on the other hand, will turn aside by rolling at the bend of FIG. 1A and move forward without remaining at the bend, but the spherical body similarly becomes impeded or is prevented from moving at a T-shaped bend such as the one shown in FIG. 1B. In brief, the conventional bodies of whatever shape are not fully smoothly movable through various bends which are provided by joints and fittings. This is one of the serious problems encountered in the efficient performance of the desired work within pipes.

SUMMARY OF THE INVENTION

In view of the above situation, the present invention has been accomplished to provide a moving body which is provided with very simple economical means and which is thereby made properly and smoothly movable through bends such as those mentioned above.

An object of the invention is to provide a moving body comprising a plurality of members each symmetrical with respect to a plane perpendicular to the direction of its movement for performing work in the interior of pipes and all congruent or approximately congruent with one another, the members being interconnected by a flexible linear member.

Another object of the invention is to provide a moving body comprising two spherical members each symmetrical with respect to a plane perpendicular to the direction of its movement for performing work in the interior of pipes and each congruent or approximately congruent with the other, the spherical members being interconnected by a flexible linear member.

Another object of the invention is to provide a method of performing work within a pipe characterized by applying a fluid pressure to the back side of a moving body as placed in the pipe to thereby move the body along the line of flow through the pipe and perform the work, the moving body comprising a plurality of members each symmetrical with respect to a plane perpendicular to the direction of its movement and all congruent or approximately congruent with one another, the members being interconnected by a flexible linear member.

Another object of the invention is to provide a method of forming a reformed pipe having an inner layer of the desired properties by placing a moving body into an installed pipe and applying a back pressure to the body to thereby advance the body and spread a lining composition injected into the pipe ahead of the body, the moving body comprising two members which are preferably spherical and each of which is symmetrical with respect to a plane perpendicular to the direction of its advance and is congruent with the other, the members being interconnected by a flexible linear member.

The moving body of this invention useful for working is smoothly movable through L-shaped, T-shaped and otherwise shaped bent portions of pipes, so that the interior of such pipes can be worked on smoothly for various purposes. Especially outworn pipes can be reformed easily by using the moving body for forming a lining layer of relatively large thickness on the inner surface of the pipe which serves as a form or frame.

Other objects and advantages of the present invention will become apparent from the following description of embodiments given with reference to the accompanying drawings.

BRIEF DESCRIPTION OF THE DRAWINGS

FIGS. 1A and 1B are side elevations schematically showing the movement of conventional moving bodies at bends of pipes;

FIG. 2 is an overall diagram showing moving bodies of the invention as they are being used for lining;

FIGS. 3A and 3B are side elevations schematically showing how the moving body passes through a T-shaped bend;

FIG. 4 is a side elevation schematically showing how the moving body passes through a different T-shaped bend;

FIGS. 5A to 5E are side elevations showing examples of members shaped differently for constituting moving bodies;

FIG. 6 is an enlarged view in section showing the moving body; and

FIG. 7 is a sectional view showing the moving body as it is being used for lining a wornout pipe with a liquid resin composition to reform the pipe.

DESCRIPTION OF THE PREFERRED EMBODIMENTS

Embodiments of the invention will be described below in detail. FIG. 2 shows a pipe 1 which is prepared with its opposite ends opened for working. Moving bodies A are inserted in the pipe 1 at one open end. The pneumatic pressure produced by a blower 5 and supplied via a pressure adjusting device 6 and a stop valve 7 is applied to the moving bodies A as a back pressure to cause the bodies A to move toward the other open end along the inner surface of the pipe 1, whereby work, for example lining, is performed within the pipe 1. The moving body A comprises two members 2, 2′ each of which is symmetrical with respect to a plane perpendicular to the direction of its movement and which are congruent or approximately congruent with each other. FIGS. 5A to 5E show examples of such members 2, 2′ which are spherical, regular hexagonal, elliptical, oval or irregular hexagonal. (Although the illustrated moving body comprises two members, three or more members may constitute such a moving body.) These members 2, 2' are interconnected by a flexible linear member 3, such as a string of fabric, wire or spring. Member 3, as shown in FIG. 2, preferably extends in length between the opposed faces of members 2 and 2' no greater than half the pipe diameter. The linear member 3 must have such strength that it will not be cut by flashes or fins at pipe junctions.

The two moving bodies A are placed in the pipe 1 as spaced apart by a suitable distance as seen in FIG. 2. Through a bore 8 formed in the pipe 1 close to the above-mentioned one open end, a lining composition a of relatively low viscosity is injected and filled into the space between the two bodies A, A. The blower 5 is then operated to cause a pneumatic back pressure to move the bodies A, A through the pipe 1, whereby the pipe 1 is lined with the composition a in the form of a continuous tube.

In the manner to be described below, the moving body of the present invention passes through T-shaped plugged bends where the conventional moving body encounters the foregoing problem. Of the two members 2, 2' moving forward in the front-to-rear relation shown in FIG. 3A, the preceding member 2 enters a plugged space 4 and comes to a halt at or near the inlet of the space to close the space. Since the T-shaped bend is approximately L-shaped, the following member 2' consequently strikes against the preceding stopping member 2 and moves forward into another pipe section as seen in FIG. 3B. Subsequently the member 2 which has been preceding and at a stop is pulled out by the member 2' through the linear member 3, with the result that the two members pass through the bend in a reversed front-to-rear relation indicated in phantom lines in FIG. 3B. Because the two members 2, 2' are congruent or approximately congruent with each other and are each symmetrical with respect to a plane perpendicular to the direction of its movement, the reversed front-to-rear relation produces hardly any adverse effect on the subsequent movement of the body per se and work within the pipe.

FIG. 4 shows a T-shaped bend having an elongated space 4 closed with a plug. When the preceding one 2 of the two members 2, 2' enters the space 4, the air in the space 4 is compressed to give an increased pressure, consequently acting as an air damper, whereby the preceding member 2 is stopped without moving deep into the space 4. Accordingly the two members 2, 2' behave substantially in the same manner as above and pass through the bend with their front-to-rear relation reversed without blocking. In this case, it is desirable that the length of the linear member 3 be slightly larger than the distance L of entry of the preceding member 2 into the space 4.

Most preferably the moving bodies shown in FIGS. 2 to 5 have the structure shown in FIG. 6 on an enlarged scale. The two members 2, 2' of the moving body shown are made of an elastic material. The flexible linear member 3 has such a length that the face-to-face distance between the two members is about ½ of the diameter of the pipe to be worked on. It is suitable to use a natural or synthetic rubber, especially foam rubber, as the elastic material, because when the two members made of such material are subjected to a back pressure of about 1 to 1.2 kg/cm² G and to the pressure of air confined between the members, these members are stretched radially of the pipe and brought into intimate contact with the inner surface of the pipe. Another reason is that such members run smoothly and are unlikely to locally reduce the thickness of the lining layer beneath the members under gravity. It is preferable to use a stainless steel wire rope as a linear member 3 which has suitable flexibility and strength. Advantageously the rope has a diameter of 1.6 mm for use with 2- to 3-inch pipes or about 1 mm for 1- to 1½-inch pipes. If the face-to-face distance between the two members is exceedingly larger than ½ of the diameter of the pipe to be worked on, e.g. equal to the diameter, or is extremely smaller than the diameter, the members will not turn smoothly at L-shaped or T-shaped bends. We have found that the best result can be achieved when the flexible linear member has the above-mentioned length (i.e. face-to-face distance) and suitable bending rigidity.

FIG. 6 further shows plates 9 for anchoring the linear member 3 in the members 2, 2' and retainers 10 for holding the ends of the member 3 inserted through holes in the plates 9. These plates, ends and retainers are all embedded in the foamed Neoprene rubber of the members 2, 2'.

The method of this invention for performing work within pipes is not limited to the mode shown in FIG. 2 for illustrative purposes. The mode shown in FIG. 2 is suited to the use of lining compositions of relatively low viscosity, for example, up to 10,000 cps if highest. In this case, the front and rear two moving bodies are used for holding the lining composition therebetween to prevent the composition from flowing forward before it is pushed forward by the rear moving body. However, the front moving body can be dispensed with as seen in FIG. 7 when the lining composition has a relatively high viscosity, e.g. 20,000 to 200,000 cps. The desired work can be performed satisfactorily by using the rear moving body only.

FIG. 7 shows a mode in which a lining layer 11 of considerably large thickness is formed on the inner surface of an existing underground pipe 1 which serves as a frame. Outworn pipes which require repairs are generally uneven in wall thickness and locally have exceedingly reduced wall thicknesses or holes. It is desired to line such an outworn pipe to a considerably large thickness with a lining composition of relatively high viscosity. In this case, the lining layer 11 is formed on the outworn pipe using the pipe as a frame, whereby the pipe is reformed. Since existing pipes usually have an L-shaped or T-shaped bend (as indicated in broken lines in FIG. 7), extreme difficulties are encountered in reforming the pipe in the above manner with use of a relatively viscous lining composition and a conventional moving body. The moving body, consisting of a single member, is not movable smoothly through the L- or T-shaped bend, while the back pressure for pushing the viscous composition forward is likely to leak from the periphery of the single moving member. Thus it is difficult to obtain a lining layer of uniform thickness for reforming. The working method of the invention has overcome this problem.

FIG. 7 shows a liquid resin composition b for lining which is curable at ambient temperature and which has a viscosity of about 20,000 to 200,000 cps, preferably about 30,000 cps, and a thixotropic index of at least about 3. The resin composition is, for example, of the two-component type comprising an epoxy resin as the main component and a curing agent which are mixed together immediately before lining. This composition forms a flexible resin layer.

The epoxy resin is prepared by the condensation polymerization of bisphenol A and epichlorohydrin as shown below.

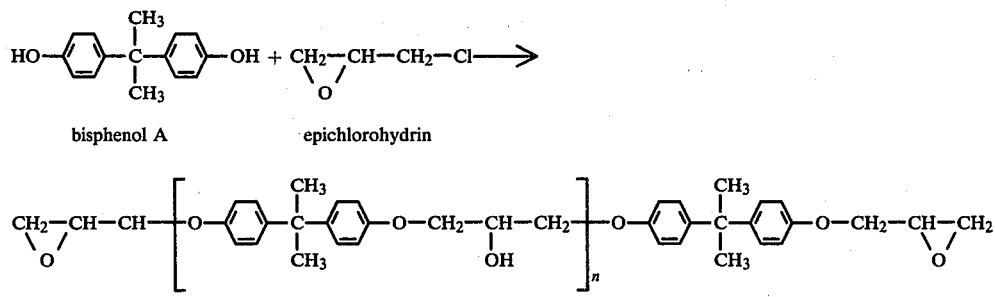

When an amine as the curing agent is added to epoxy resin (the main component), the following reactions are promoted for curing.
(1) Bonding reaction between epoxy groups by the amine.
(2) Bonding reaction of epoxy groups with an aliphatic or aromatic compound having hydroxyl.
(3) Cross-linking reaction of epoxy groups by the amine.

The resin composition forms a lining layer which is characterized in that it has shape retentivity and high stretchability and is to some extent adhesive to the inner surface of the pipe. The composition is therefore useful for fulfilling the foregoing objects.

The resin composition has further incorporated therein a thixotropic agent. Examples of useful thixotropic agents are organic agents such as low-molecular-weight polyethylene and inorganic agents such as bentonite, silicon oxide and asbestos.

When less than 20,000 cps in viscosity, the resin composition sags to make it difficult to obtain a thick layer, whereas if the viscosity exceeds 200,000 cps, the composition is too resistant to the running body, presenting difficulty in lining the pipe. Further if the resin composition is less than 3 in thixotrophic index, i.e. $\mu^2/\mu^{20}$ wherein $\mu^2$ is the viscosity thereof at a shearing speed of 2 r.p.m. and $\mu^{20}$ is the viscosity at 20 r.p.m., the lining layer after the passage of the running body has too low a sol-to-gel transition velocity and therefore sags or deforms before curing, consequently failing to have a uniform thickness. Thermosetting resins, which become less viscous when heated, are not desirable to use for the lining composition.

It is especially critical that the resin composition applied in the form of a tube of uniform or approximately uniform wall thickness to the inner surface of the outworn underground pipe 1 using the pipe as a frame be so cured that the resulting lining layer has strength to withstand an external pressure of at least about 0.1 kg/cm² G per meter of the depth at which the pipe is laid underground. This is due to the following reason. Generally the chief external pressures involved are earth pressure and groundwater pressure. Since the pipe which has been so worn out as to develop external corrosion is laid underground for a prolonged period of time, the adjoining soil has been consolidated usually to an equilibrium, while the remaining pipe wall restrains the adjoining soil. Accordingly the influence of the earth pressure on the lining layer is negligible except at the portion thereof which is directly subjected to wheel load. Thus the groundwater pressure is the external pressure factor to be considered. The groundwater pressure is usually about 0.1 kg/cm² G per meter of the depth.

Under the condition involving an abnormal earth pressure due to wheel load, etc., the lining layer may be adapted to have an elongation of about 10 to 100%, preferably about 20%. The layer will then undergo elastic deformation to absorb and mitigate the abnormal earth pressure, so that the leakage of fluid resulting, for example, from the rupture of the layer is avoidable.

Preferably the lining layer has a thickness of about 1/100 to 1/10 of the diameter of outworn pipes. In practice, the thickness ranges from about 1 mm to 10 mm. For example, the thickness is about 2 mm for 2-inch pipes.

The method of FIG. 2 or 7 will entail an objectionable result when practiced for an existing pipe having a leak of unnegligible size. The lining composition flowing through the leak to the adjoining soil when lining fails to remain there because immediately after the passage of the moving body, the fluid pressure for running the body causes a blowout. The objection can be overcome by maintaining the interior of the pipe 1 at a pressure higher than the pressure for running the body A for lining for a predetermined period of time before lining. The lining composition a or b then fully flows into the adjoining soil through the leak to consolidate the soil. More specifically this may be done by filling the pipe 1 with the lining composition and maintaining the interior at an incrased pressure for a period of time, or by inserting a pair of front and rear moving bodies A, A into one end of the pipe 1 with the lining composition held therebetween and moving the bodies A, A to the location where the bodies are positioned on the opposite sides of the leak, with the other end of the pipe 1 closed.

What we claim is:

1. In combination, a pipe and a moving body for performing work within said pipe by applying a fluid back pressure on the body as placed in the pipe to thereby move the body through the interior of the pipe, comprising two spherical members made of an elastic material, and a flexible linear member interconnecting the two spherical members, wherein the flexible linear member extending between opposed faces of the two spherical members is no greater in length than half of the diameter of the pipe.

2. A moving body as defined in claim 1 wherein the flexible linear member extending between the opposed faces of the two spherical members has a length about ½ of the diameter of the pipe.

3. A moving body as defined in claim 2 wherein the two spherical members are made of foam rubber.

4. A moving body as in claim 1 wherein said linear member is a stainless steel rope.

5. A method of performing work within a pipe comprising the steps of placing in the pipe a moving body comprising two spherical members made of an elastic material and interconnected by a flexible linear member, the length of the flexible linear member extending between the two spherical members being no greater than half the diameter of the pipe, and applying a fluid pressure to the back side of the moving body to thereby move the body along the line of flow through the pipe.

6. A method as in claim 5 wherein the length of said flexible linear member is about half the diameter of the pipe.

7. A method as in claim 5 wherein said linear member is a stainless steel rope.

8. A method as defined in claim 5 wherein the moving body comprises two spherical members made of foam rubber and interconnected.

* * * * *